UNITED STATES PATENT OFFICE.

WILLIAM C. ROBERTSON, OF NEW YORK, N. Y.

SURFACE-PRINTING.

SPECIFICATION forming part of Letters Patent No. 420,698, dated February 4, 1890.

Application filed February 28, 1889. Serial No. 301,548. (No model.)

*To all whom it may concern:*

Be it known that I, WILLIAM C. ROBERTSON, of the city, county, and State of New York, have invented a new and useful Improvement in Surface-Printing, of which the following is a full, clear, and exact description.

This invention relates to surface-printing, whether by engraving or otherwise, from zinc and other plates, and has mainly for its object the production of as perfect prints therefrom as if made from stone by the ordinary lithographic process, but which has the advantage over stone in the plate being more easily handled and less liable to break.

The invention consists in a preparation of or application to the zinc or other plate of a substance that by exposure to heat becomes insoluble to turpentine and which provides for the printing being done from oil, thus virtually converting the zinc or other plate into a lithographic stone and making the prints therefrom the same in effect and as certain as if from stone, also affording every facility for renewal and adding to the printing durability of the plate, substantially as hereinafter described, and pointed out in the claim.

In describing my invention I shall more particularly mention it as applied to zinc plates in preference to other plates, although it is applicable to other plates, including slate. This I shall do not only as a matter of convenience, but because zinc plates are in many respects the most suitable; and here I would remark at the outset that so far as my invention is concerned it is immaterial how the drawing or matter to be printed is applied to the zinc plates. Such may be done either by original drawings or by rub-tints direct after the manner of working on stone; but the following mode of proceeding will answer as well as any other to explain how my improvement in surface-printing is or may be carried out: I first make a transfer from stone in the ordinary or any suitable manner, and then gum the zinc plate all over with the usual gum and allow it to dry. I then remove all ink from the surface of the zinc plate with turpentine or other dissolvent. After this I proceed to apply the novel feature of my invention, which consists in putting on the zinc or printing plate a preparation of linseed-oil made with any suitable drier and thinned with turpentine to provide for spreading it thinly and easily over the surface of the plate. I then subject the plate thus prepared to a sufficient heat to evaporate or remove the turpentine and to make the linseed-oil residue insoluble in turpentine, which enables the print to be made from the preparation as above described applied to the plate, and whereby the printing is done from oil or oleaginous material, as in the case of printing from stone, and the effect produced is the same. The necessary heat to eliminate the turpentine and to make the linseed-oil insoluble in turpentine may vary from 100° to 125° Fahrenheit, more or less.

By means of the preparation as above applied to the plate a fac-simile of the original drawing is produced, the print is certain and similar to that produced from stone direct, and the preparation can be renewed at any time. Should the plate become tinted, I am enabled by means of this method or applied preparation to remove all ink from the surface of the plate with turpentine without removing the preparation. Then give the plate an etching, gum in, dry, then wash the gum off, and proceed to print in the usual manner.

Having thus fully described my invention, I claim as new and desire to secure by Letters Patent—

As an improvement in the art of surface-printing from zinc and other plates, the method herein described of preparing the printing-surface, which consists in applying to or over the plate, after the latter has been inked, gummed, dried, and the ink subsequently removed by turpentine or other dissolvent, a substance made by heat insoluble to turpentine, and which is composed of linseed-oil having mixed with it any suitable drier and afterward thinned with turpentine, and the whole after application to the plate subsequently heated to remove the turpentine and make the oil which forms the printing-surface insoluble in turpentine, substantially as specified.

WILLIAM C. ROBERTSON.

Witnesses:
RUSHMORE G. WILLIAMS,
EDGAR TATE.